(12) United States Patent
Sato et al.

(10) Patent No.: US 8,285,219 B2
(45) Date of Patent: Oct. 9, 2012

(54) APPARATUS AND METHOD FOR SEARCHING FOR WIRELESS STATION LOCATIONS

(75) Inventors: Yoshihito Sato, Hitachi (JP); Kenji Imamoto, Hitachi (JP); Yoshinori Okura, Mito (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 12/778,237

(22) Filed: May 12, 2010

(65) Prior Publication Data
US 2010/0291878 A1 Nov. 18, 2010

(30) Foreign Application Priority Data

May 15, 2009 (JP) ................................. 2009-118179

(51) Int. Cl.
*H04B 17/00* (2006.01)
*H04W 40/00* (2009.01)

(52) U.S. Cl. ..................................... 455/67.11; 455/446

(58) Field of Classification Search ............... 455/456.1, 455/456.3, 456.4, 456.5, 402.2, 65, 63.4, 455/440, 70, 67.1, 457, 401.1, 404.2, 414.2, 455/456.6, 67.11
See application file for complete search history.

(56) References Cited

U.S. PATENT DOCUMENTS

| | | | | |
|---|---|---|---|---|
| 3,765,773 A * | 10/1973 | Weiner | ........................... | 356/364 |
| 5,689,812 A | 11/1997 | Takahashi | | |
| 6,785,547 B1 * | 8/2004 | Heiska et al. | ................. | 455/446 |
| 7,880,671 B2 * | 2/2011 | Lee et al. | ...................... | 342/169 |
| 2001/0041565 A1 * | 11/2001 | Vicharelli et al. | ............ | 455/423 |
| 2004/0259554 A1 | 12/2004 | Rappaport et al. | | |
| 2008/0161005 A1 | 7/2008 | Sato et al. | | |

FOREIGN PATENT DOCUMENTS

| | | |
|---|---|---|
| JP | 2000-28665 | 1/2000 |
| JP | 2006-191699 | 7/2006 |
| JP | 2006-287685 | 10/2006 |
| WO | WO 97/44977 | 11/1997 |

OTHER PUBLICATIONS

Yongming Huang et al., A Novel Technique for Indoor Radio Propagation Modeling, IEEE 2002, pp. 335-338, Beijing University of Posts and Telecommunications, Beijing, China, Email: ymhuang1999@yahoo.com.

* cited by examiner

*Primary Examiner* — Nay A Maung
*Assistant Examiner* — Cindy Trandai
(74) *Attorney, Agent, or Firm* — Antonelli, Terry, Stout & Kraus, LLP.

(57) ABSTRACT

A technique is offered which is adapted for optimization computations and which makes it possible to carry out an estimation of the state of propagation of radio waves quickly and accurately during a search for the locations of wireless stations. During the optimization computations, sending points and receiving points are set using a parameter search technique. Propagation paths are computed using a far-field approximation technique for Maxwell's equations. A propagation path leading to a local area where the accuracy is low with the far-field approximation technique is extracted from the computed paths. The state of scattering previously calculated using a numerical analysis technique for Maxwell's equations is reflected in the extracted path to modify the propagation path. The communication characteristics of the modified path are evaluated. The steps S101-S105 are performed repeatedly a given number of times. A sending point and a receiving point producing optimum communication characteristics are output.

12 Claims, 12 Drawing Sheets

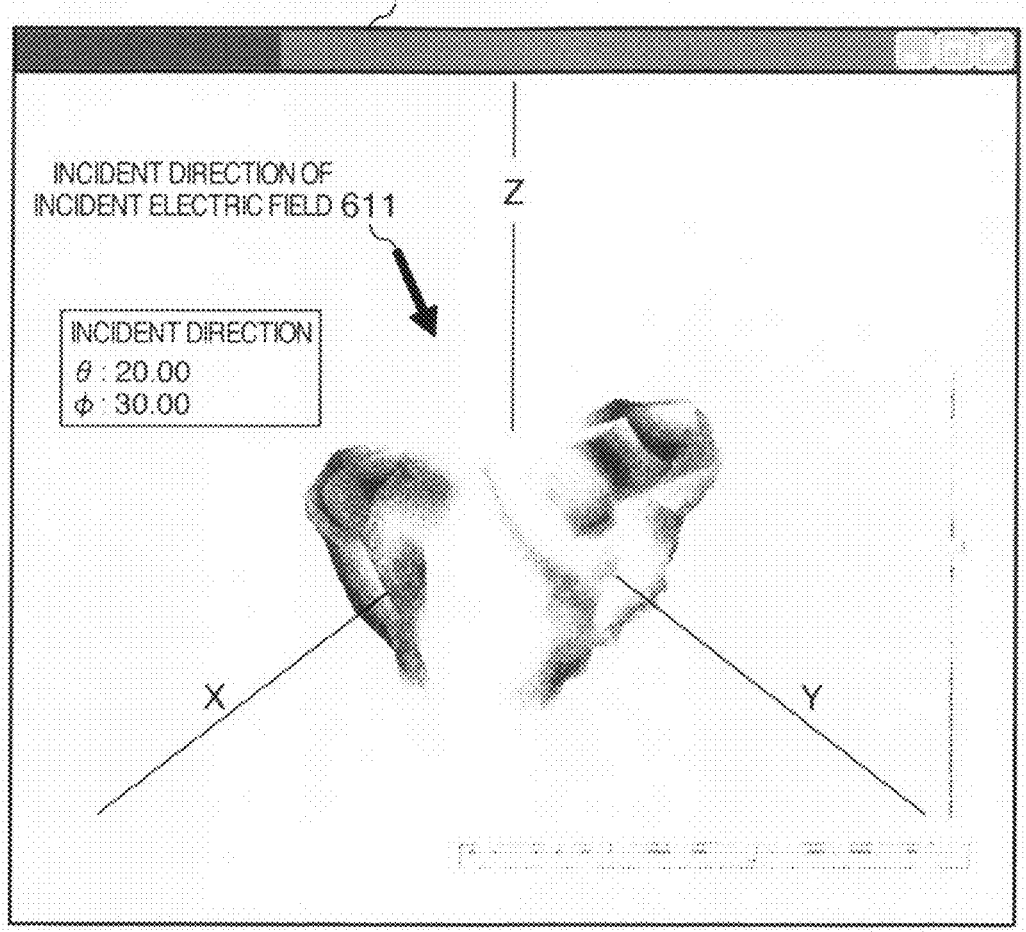

1ST-ORDER FRESNEL ZONE 800
FRESNEL ZONE RADIUS R(d)
SHORTEST PATH
SENDING POINT 801
BYPASS PATH
RECEIVING POINT 802
DISTANCE d
DISTANCE (D-d)
DISTANCE D

FRESNEL RADIUS $R(d) = \sqrt{\dfrac{\lambda d (D-d)}{D}}$

NOTE: $\lambda$ IS THE WAVELENGTH OF RADIO WAVES.

FIG.11

1100 LOCAL SCATTERING DATA

| 1201 INCIDENT ANGLE | | 1202 EXIT ANGLE | | 1203 | | | | | 1204 | | | |
|---|---|---|---|---|---|---|---|---|---|---|---|---|
| | | | | DISTANCE BETWEEN SENDING AND RECEIVING POINTS | COEFFICIENT OF VERTICALLY POLARIZED COMPONENT | | COEFFICIENT OF HORIZONTALLY POLARIZED COMPONENT | | DISTANCE BETWEEN SENDING AND RECEIVING POINTS | COEFFICIENT OF VERTICALLY POLARIZED COMPONENT | | COEFFICIENT OF HORIZONTALLY POLARIZED COMPONENT |
| $\theta i$ | $\phi i$ | $\theta r$ | $\phi r$ | d1 | Etr1 | Eti1 | Ehr1 | Rhi1 | d2 | Etr2 | Eti2 | Ehr2 | Rhi2 |
| 0 | 0 | 0 | 0 | 10 | | | | | 100 | | | | |
| 0 | 0 | 0 | 10 | 10 | | | | | 100 | | | | |
| ⋮ | | ⋮ | | | ⋮ | | | | | ⋮ | | | |
| 0 | 0 | 0 | 360 | 10 | | | | | 100 | | | | |
| 0 | 0 | 10 | 0 | 10 | | | | | | | | | |
| 0 | 0 | 10 | 10 | 10 | | | | | 100 | | | | |
| ⋮ | | ⋮ | | | ⋮ | | | | | ⋮ | | | |
| 0 | 0 | 10 | 360 | 10 | | | | | 100 | | | | |
| 0 | 0 | 20 | 0 | 10 | | | | | 100 | | | | |
| ⋮ | | ⋮ | | | ⋮ | | | | | ⋮ | | | |
| 0 | 360 | 180 | 360 | 10 | | | | | 100 | | | | |
| 180 | 360 | 180 | 360 | 10 | | | | | 100 | | | | |

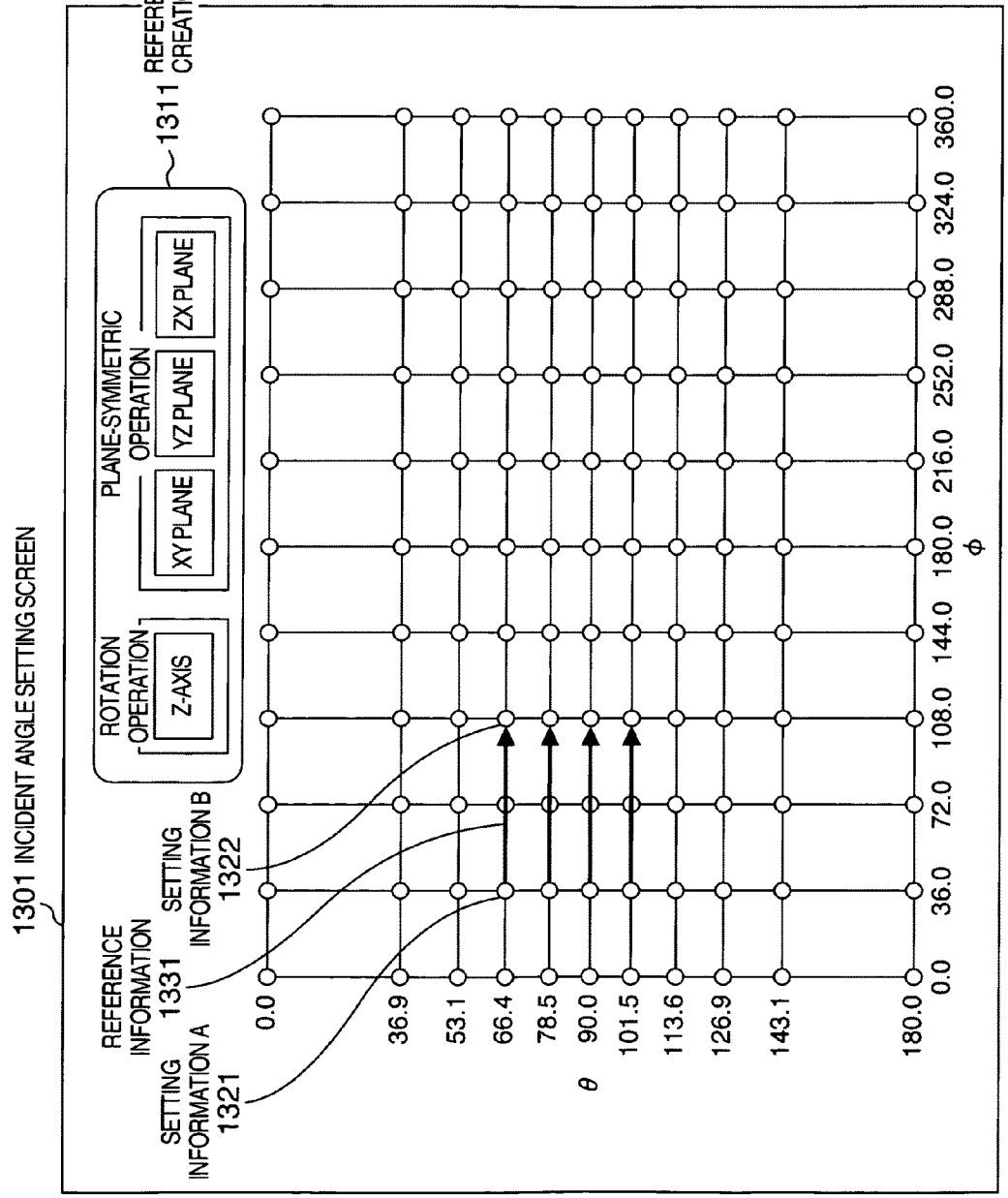

APPARATUS AND METHOD FOR SEARCHING FOR WIRELESS STATION LOCATIONS

BACKGROUND OF THE INVENTION

The present invention relates to apparatus and method for searching a wireless network system for wireless station locations.

When a wireless network system is built, it is necessary to arrange wireless stations such that wireless communications are established between wireless stations and between wireless terminals with a probability higher than a given value. Furthermore, a tradeoff relationship exists between a requirement that each one wireless station provide wide area coverage and a requirement that the interference between wireless stations be reduced. Therefore, in order to suppress the costs, it is necessary to appropriately determine the number of wireless stations and their radio-wave output power levels. It is known that propagation of radio waves between wireless stations and terminals is affected by structural objects and geography around the wireless stations and terminals. In view of these circumstances, discussions have been conducted to improve the accuracy of estimation of the state of radio wave propagation while reducing resources used to calculate the state.

For example, ray tracing algorithms, FDTD (finite-difference time-domain) method, finite element method, and other methods are available as techniques for analyzing radio wave propagation in wireless communications. Any of these methods fundamentally performs approximate calculations of Maxwell's equations. However, the accuracy and time of computation are different among different calculational methods regarding various conditions including the scale of the wireless service area of interest, complexity, and frequency band of radio waves.

A ray tracing algorithm is considered to be a far-field approximation to Maxwell's equations, and is effective where the wavelength is short compared with the size of the structural objects to be computed. A ray tracing algorithm is also known as a geometric optics approximation, and it can be said that electromagnetic waves are approximated by light propagation. Therefore, it is easy to calculate the state of the light propagation path, and only a small amount of computational resources is required. However, there is the disadvantage that the accuracy of estimation of the state of propagation path is deteriorated in cases where the effects of near fields are great.

The FDTD method is an analysis technique for directly solving Maxwell's equations by discretizing them on the time and spatial axes while retaining the differential form. That is, in the FDTD method, an analyzed region is divided into lattice cells. Electric and magnetic fields calculated about one lattice cell are input to an adjacent cell. Thus, electric and magnetic fields are calculated in turn. The FDTD method can improve the accuracy of estimation of the state of propagation by reducing the size of each lattice cell and shortening the time interval. However, there is the disadvantage that the amount of computational resources is huge because the size of the analyzed space is increased and/or because the frequency is in the radio frequency domain.

In the finite-element method, electric field variables or magnetic field variables defined in terms of finite elements are found from Maxwell's equations based on the variation principle such that the energy of the system is minimized. Therefore, the finite-element method can analyze a region by dividing it into lattice cells in the same way as in the FDTD method. Consequently, the finite-element method has the same disadvantage as the FDTD method.

The prior art technique relative to optimization of the locations of base stations is disclosed, for example, in patent document 1. In particular, at each geographical point of wireless cells formed by base stations, the presence or absence of the visibility to every base station existing around is calculated based on geographical and height data. The positions of the base stations are computationally optimized such that a maximum is obtained at a geographical point providing a visibility to at least one base station. Non-patent document 1 discloses another method. Specifically, a propagation path is determined by a ray tracing algorithm. If a structural object for which near fields cannot be neglected is present in the determined path, the structural object is analyzed using an FDTD method while using the state of the propagation path as an incident condition. The state of the output from the structural object is computed. The state of the output is taken as the state of the next propagation path. The next propagation path is determined again using the ray tracing algorithm.

Prior art techniques relevant to the present invention are disclosed, for example, in JP-A-2006-191699 (patent document 1) and by Yongming Huang et al., "A Novel Technique for Indoor Radio Propagation Modeling", Electromagnetic Compatibility 2002 3rd International Symposium on 21-24 May 2002, pp. 335-338 (non-patent document 1).

However, the propagation analysis technique described in patent document 1 is based on the premise that a far-field approximation holds. Therefore, if a far-field approximation does not hold in spite of the fact that an optimization computation is performed, the presence or absence of a visibility gives rise to large error. This presents the problem that base stations are not arranged appropriately. Especially, in a closed space such as an indoor space, electric power is not easily diffused to remote locations and there are many objects or areas having sizes for which the effects of near fields cannot be neglected. Therefore, there is the problem that large error is produced. In the technique of non-patent document 1, whenever a light ray used in a tray tracing algorithm impinges on an area or structural object for which the effects of near fields cannot be neglected, an analysis is performed on the area using an FDTD method. Consequently, there is the problem that the quickness of the ray tracing algorithm is spoiled. Furthermore, a long computation time is taken to perform analyses using FDTD. Consequently, this technique is not suitable for an optimization computation in which an analysis is performed repetitively while varying the wireless station positions.

SUMMARY OF THE INVENTION

Accordingly, it is an object of the present invention to provide a technique which is adapted for optimization computations and which carries out an estimation of the state of radio wave propagation quickly and accurately in searching for wireless station locations.

To achieve the foregoing object, the present invention provides a wireless station location searching apparatus for performing an optimization computation on the number of wireless stations within an area where they are arranged and on their installation positions. Regarding structural objects within the area, propagation of radio wave through fields close to the structural objects is analyzed. A scattering model is created concomitantly with the incidence of rays. The model is previously stored in a database, During an optimization computation, a propagation path and the state of radio wave propagation in the path are calculated by a ray tracing algorithm while referring to the scattering model in the database. Then, the number and installation locations of wireless stations are determined.

According to the present invention, it is possible to offer a technique which is adapted for optimization computations and which carries out an estimation of the state of radio wave propagation quickly and accurately in searching for wireless station locations.

The other objects and methods of achieving the objects will be readily understood in conjunction with the description of embodiments of the present invention and the drawings.

BRIEF DESCRIPTION OF THE DRAWINGS

FIG. 6 shows one example of the result of calculation of the state of reflection (scattering) and transmission in response to an incident electric field;

FIG. 11 is a table of one example of a set of local scattering data;

FIG. 13 is a diagram showing one example of screen for setting incident angles.

DETAILED DESCRIPTION OF THE INVENTION

Figure 1:
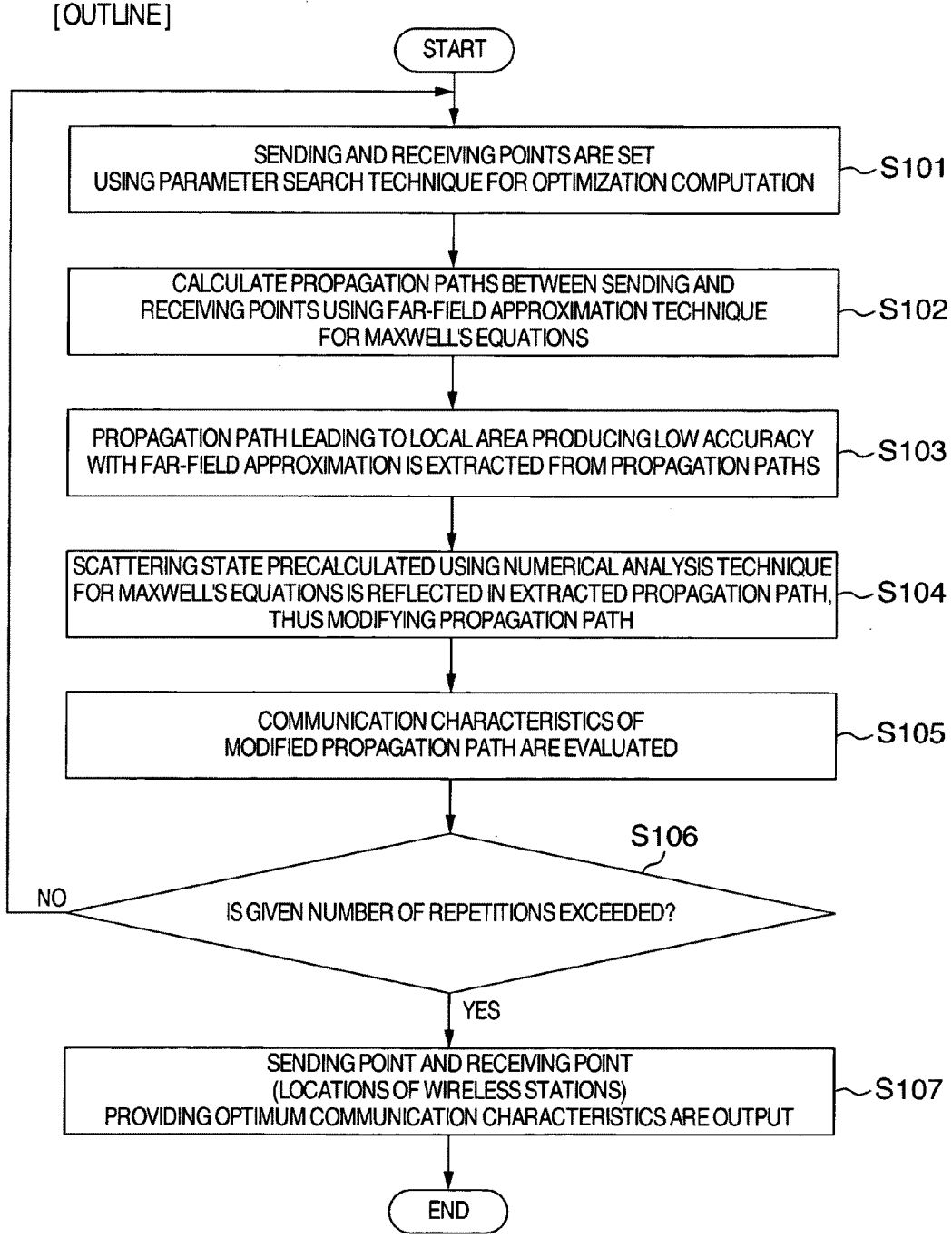
FIG. 1 is a flowchart illustrating an optimization computation performed by a wireless station location searching apparatus according to an embodiment of the present invention.

Modes for carrying out the present invention (hereinafter referred to as embodiments) are hereinafter described in detail by referring to the drawings as appropriate.
<<Summary>>

Computational procedures for optimization performed by a wireless station location searching apparatus according to one embodiment of the present invention are briefly described by referring to the flowchart of FIG. 1. In step S101, the searching apparatus sets sending points and receiving points, using a parameter search technique (such as experimental design or genetic algorithm) for optimization computations. Then, in step S102, the apparatus calculates propagation paths between the sending points and the receiving points, using a far-field approximation technique (e.g., a ray tracing algorithm) for Maxwell's equations. In step S103, the apparatus extracts a propagation path leading to a local area providing poor accuracy with the far-field approximation from the calculated propagation paths.

In step S104, the wireless station location searching apparatus causes scattering state precalculated using a technique of numerical analysis for Maxwell's equations to be reflected in the extracted propagation path, thus modifying the propagation path. Then, in step S105, the apparatus evaluates the communication characteristics of the modified propagation path, taking account of the received electric power, delay profile, angle of arrival, and the characteristics of the receiver circuit. In step S106, the apparatus makes a decision as to whether or not a given number of repetitions has been exceeded. If the decision at step S106 is Yes (i.e., the given number of repetitions has been exceeded), control goes to step S107, where the sending point and receiving point (locations of wireless stations) giving communication characteristics evaluated to be optimal at that time are output to the display portion or the like. If the decision at step S106 is No (i.e., the given number of repetitions has not been exceeded), control returns to step S101, where the computational processing is repeated.

As illustrated in the flowchart of FIG. 1, regarding local areas resulting in lower approximation accuracy of a ray tracing algorithm, scattering state accurately calculated previously in step S104 by an FDTD method is reflected while utilizing the fastness of the ray tracing algorithm in step S103 to modify the propagation path and, therefore, an estimation of the state of radio wave propagation adapted for optimization computations can be carried out quickly and accurately
<<Wireless Station Location Searching Apparatus>>

Figure 2:
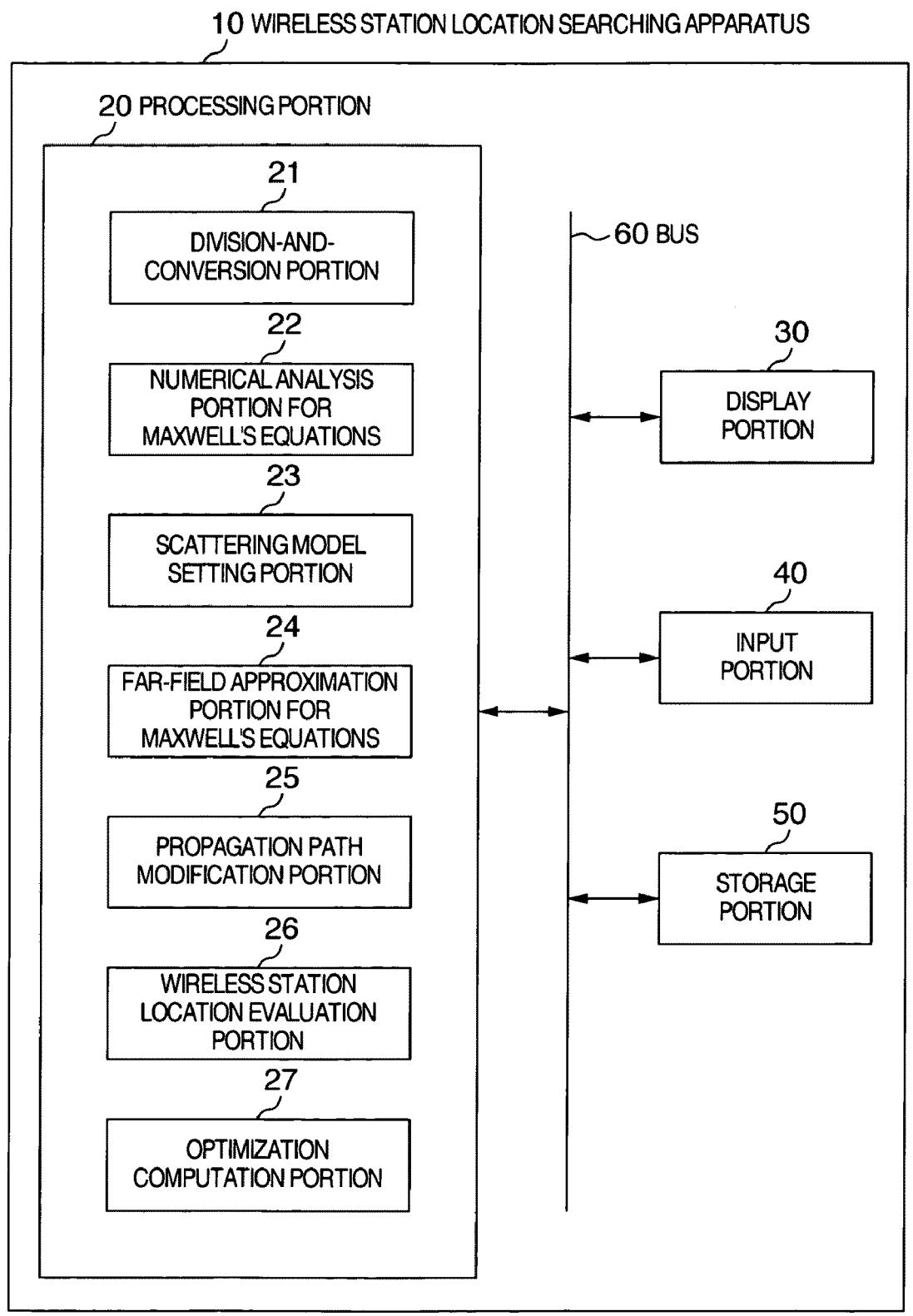
FIG. 2 is a block diagram showing one example of structure of the wireless station location searching apparatus according to the embodiment.

An example of configuration of the wireless station location searching apparatus 10 according to the present embodiment is described by referring to FIG. 2. The apparatus 10 has a processing portion 20, a display portion 30, an input portion 40, and a storage portion 50 which are interconnected via a bus 60 such that data can be exchanged between them. The processing portion 20 is a CPU (central processing unit) of a computer. The CPU expands an application program into the main memory and executes the program, thus implementing the functions of the processing portion 20. For example, the display portion 30 is a display device, speakers, or printer. A screen for accepting a user's input, the state of input data, the final result, and so on are displayed on the display portion 30. For example, the input portion 40 is a keyboard, mouse, scanner, or microphone. The input portion 40 accepts a user's input and sends the input data to the processing portion 20. The storage portion 50 consists, for example, of a storage medium (such as a CD-R (compact disc recordable) or DVD-RAM (digital versatile disc-random access memory), silicon disk) and a drive unit for the medium (such as a HDD (hard disk drive)). The storage portion 50 stores the application program run in the processing portion 20, various kinds of information used for calculations, and the results of the calculations.

The functions of the processing portion 20 are implemented by a division-and-conversion portion 21, a numerical analysis portion 22 for Maxwell's equations, a scattering model setting portion 23, a far-field approximation portion 24 for Maxwell's equations, a propagation path modification portion 25, a wireless station location evaluation portion 26, and an optimization computation portion 27. The portions 21-27 will be described in detail by referring to FIGS. 3-13.

<<Processing Routine for Creation of Local Scattering Data>>

Figure 3:
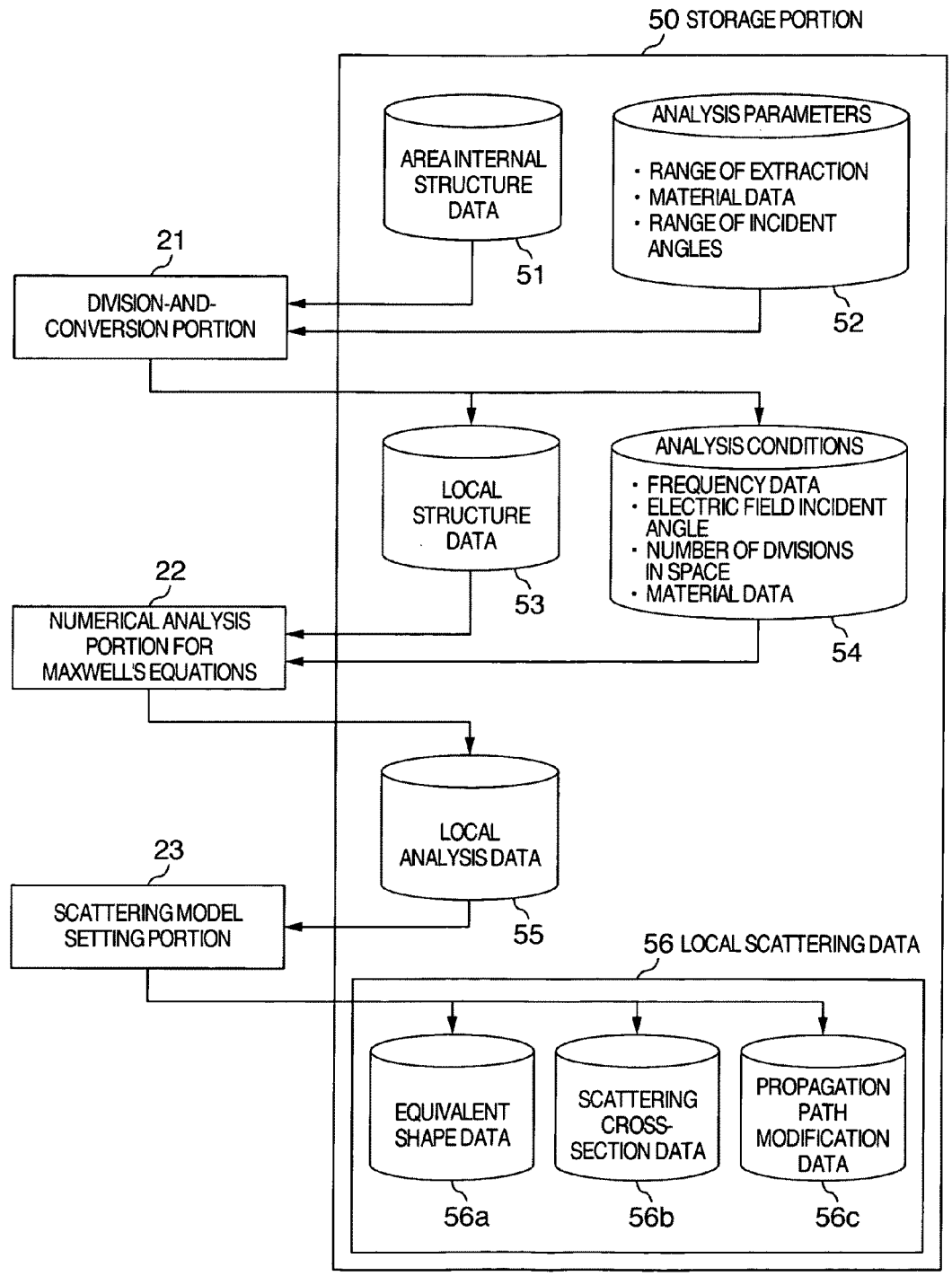
FIG. 3 is a block diagram illustrating functions of the wireless station location searching apparatus to implement a flow subroutine for calculating local scattering data about an area to which any far-field approximation for Maxwell's equations cannot be applied.
Figure 4:
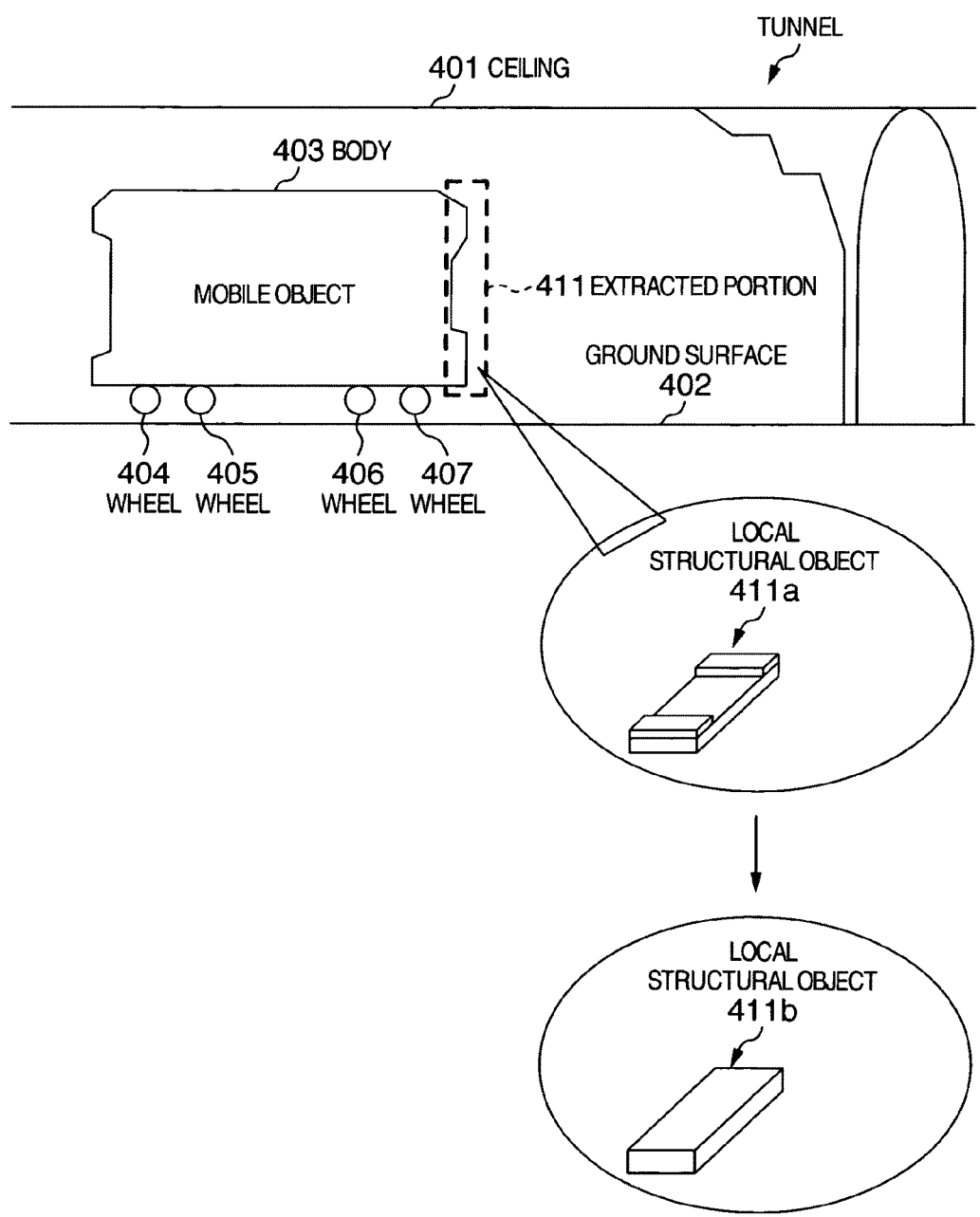
FIG. 4 illustrates one example of how a structural object within a communication area is modeled.

FIG. 3 illustrates a flow routine for creating local scattering data (scattering information) about each local area to which any far-field approximation for Maxwell's equations cannot be applied. The local scattering data is referenced to modify the propagation path in step S104 of FIG. 1.

As shown in FIG. 3, the division-and-conversion portion 21 creates local structure data 53 and analysis conditions 54, using area internal structure data 51 and data about analysis parameters 52. Where a tunnel shown in FIG. 4 and a mobile object (an object or an area where near fields cannot be neglected) located within the tunnel are taken as an example, the area internal structure data 51 are three-dimensional graphical data about the ceiling 401 of the tunnel, ground surface 402, the body 403 of the mobile object, and its wheels 404, 405, 406, and 407. The three-dimensional (3D) graphic data are generally described by combinations of parts such as rectangular parallelepipeds, spheres, and cylinders.

The three-dimensional graphic indicated by the 3D graphic data is divided into parts based on the analysis parameters 52, which are set via the input portion 40. For example, the analysis parameters 52 are a range from which a part is extracted, material data, or a range of incident angles of radio waves corresponding to the number of divisions of incident angles of radio waves. Where the analysis parameters are a range from which a part is extracted, side surfaces of the body 403 of the mobile object are extracted as indicated by the broken line from an extracted portion 411 (range indicated by the broken line) of FIG. 4. As a result, the graphic is treated as a 3D graphic composed of a large rectangular parallelepiped and two smaller rectangular parallelepipeds attached to the opposite ends of the large parallelepiped as indicated by a local structural object 411a (local structure). Where the fine structures of the graphic can be neglected compared with the wavelengths of assumed radio waves, the graphic may be treated as a single rectangular parallelepiped as indicated by a local structural object 411b (local model).

The local structure data 53 is obtained by converting the three-dimensional graphic data into an input format adapted to be input to the numerical analysis portion 22 for Maxwell's equations. For example, where the numerical analysis portion 22 for Maxwell's equations utilizes an FDTD method, CAD (computer aided design) data that is three-dimensional graphic data can be converted into an input format applicable to the FDTD method, using a conversion technique disclosed in JP-A-2000-28665.

Figure 5:
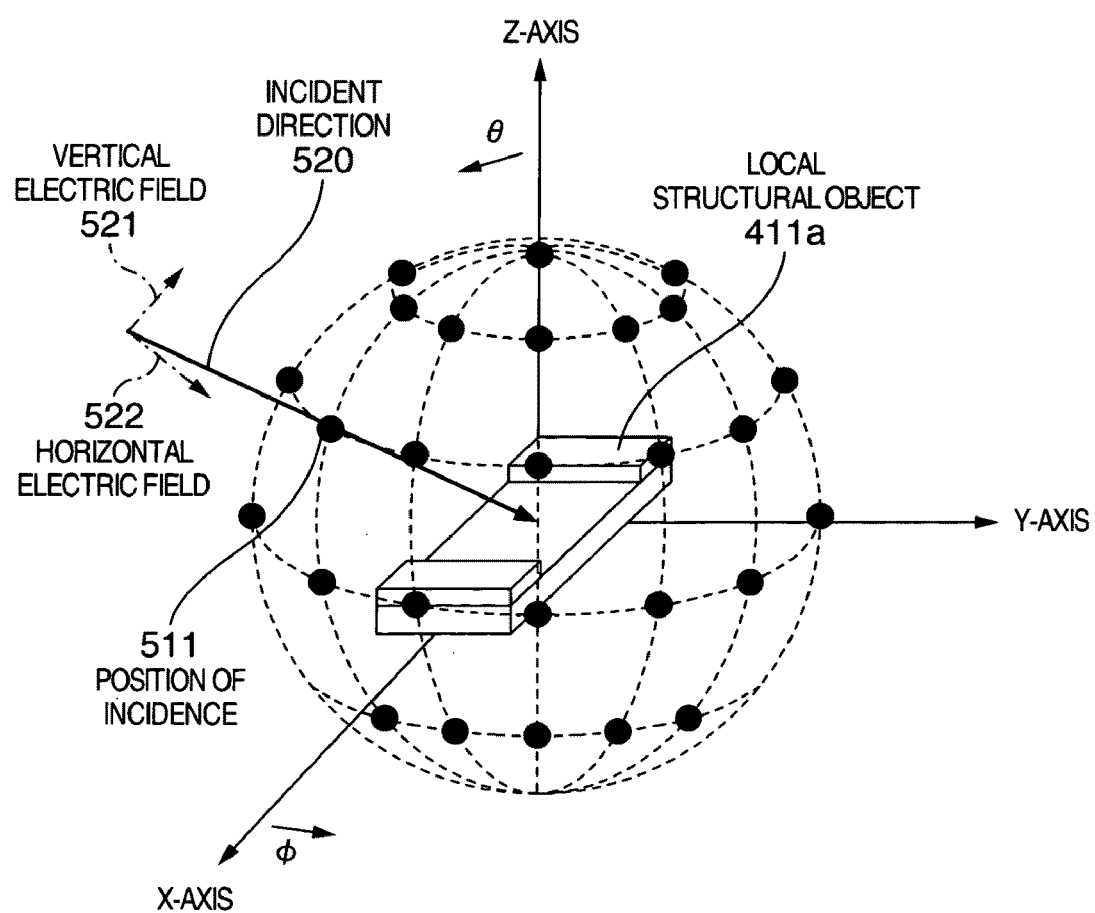
FIG. 5 is a diagram illustrating one example of analysis conditions regarding a modeled structural object.

The analysis conditions 54 specify conditions under which an analysis is performed for each data set of the local structure data 53. The analysis conditions 54 include data about the frequencies of an electric field applied to the local structure indicated by the local structure data 53, the incident angle of the electric field, the number of divisions of space, and material data. In FIG. 5, incident angles of electric fields and division numbers of space are shown as examples of the analysis conditions 54. It is assumed that the local structural object 411a is placed in an XYZ-axis space. On the spherical surface including the local structural abject 411a (indicated by the broken lines in FIG. 5), the whole solid angle is uniformly divided by the number of divisions of space into equally spaced angles. At each of the angles, the position of incidence 511 of an electric field is set as indicated by a black circle. It is assumed that the incident direction 520 of an electric field is so set that it enters from the position of incidence 511 of the field toward the origin of the XYZ-axis space. At this time, the incident angle can be uniquely specified by two angular values, i.e., angle θ from the Z-axis and angle φ from the X-axis. With respect to entered electric fields, a vertical electric field 521 and a horizontal electric field 522 are set in conformity with the incident angle.

Referring back to FIG. 3, the numerical analysis portion 22 for Maxwell's equations produces local analysis data 55 using the local structure data 53 and the analysis conditions 54. The numerical analysis portion 22 for Maxwell's equations performs an analysis taking account of near-field components of Maxwell's equations. For example, the numerical analysis portion 22 for Maxwell's equations can employ an FDTD method, finite-element method, moment method, or other method. The local analysis data 55 are the results of analyses of the local structural objects 411a and 411b (see FIG. 4) performed for each incident angle.

Then, the scattering model setting portion 23 creates local scattering data 56 using the local analysis data 55. The local analysis data 56 includes equivalent shape data 56a, scattering cross-section data 56b, and propagation path modification data 56c. The equivalent shape data 56a stores data about a shape (such as the local structural object 411b of FIG. 4) from which the fine structures that can be neglected compared with the wavelengths of radio waves have been omitted.

The scattering cross-section data 56b stores data indicating the angle and strength of a radiating electric field relative to the incident direction 611 of an incident electric field as shown on a scattering cross-section confirmation screen 601 of FIG. 6. That is, the scattering cross-section data 56b stores scattering factors (complex scattering factors). Note that FIG. 6 shows that as the distance from the origin of the XYZ-coordinate system increases, stronger scattering wave is produced.

The propagation path modification data 56c stores data for modifying the propagation path (propagation path modification information associated with propagation loss and phase shift) in cases where the propagation path calculated by the far-field approximation technique (e.g., ray tracing algorithm) for Maxwell's equations is reflected from or transmitted through the surface of the structural object indicated by the equivalent shape data 56a or in cases where a structural object is contained in a region within the first-order Fresnel zone radius relative to the propagation path. In this example, the first-order Fresnel zone radius is set as the distance. The distance may be increased or reduced by multiplying it by a factor. Alternatively, second- or third-order Fresnel zone radius may be used. If there is no obstacle in a range that is about 60 percent of the first-order Fresnel zone radius, it is considered that electric power that is substantially equal to power that would be transmitted if there were a visibility is transmitted. A selection can be made while considering the tradeoff between the required accuracy and the computational resources. The Fresnel zone radii will be described later.

<<Modification of Propagation Path in Cases where Reflection at or Transmission Through a Structural Object Occurs>>

Figure 7A:
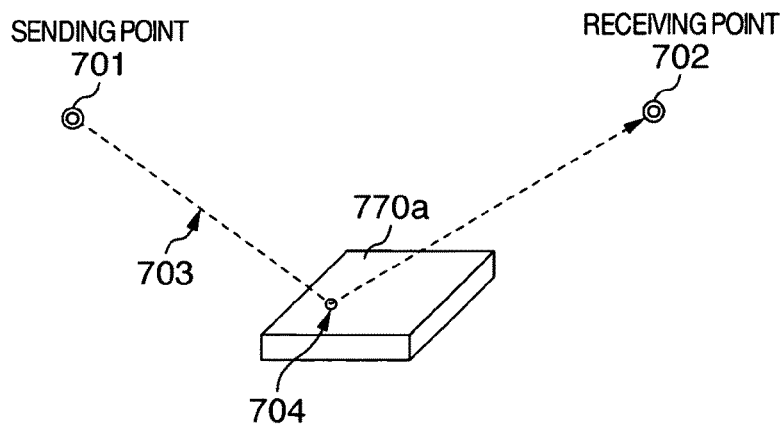
FIG. 7A illustrates a face type method for modifying a propagation path when reflection or scattering has occurred.
Figure 7B:
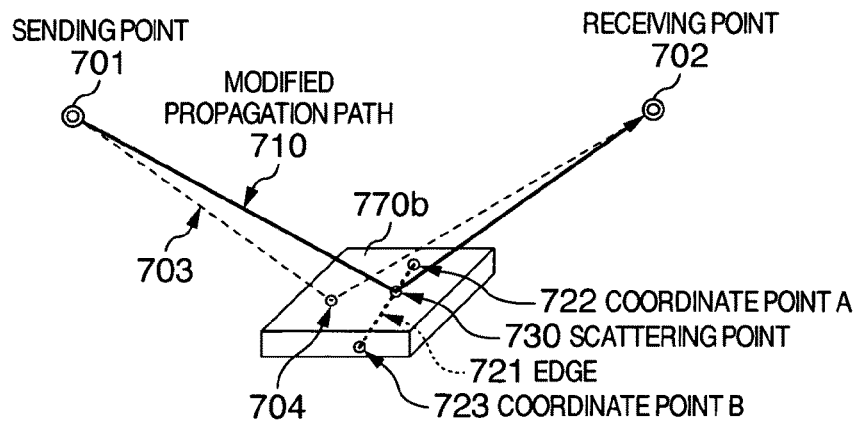
FIG. 7B illustrates an edge type method for modifying a propagation path when a reflection has occurred.
Figure 7C:
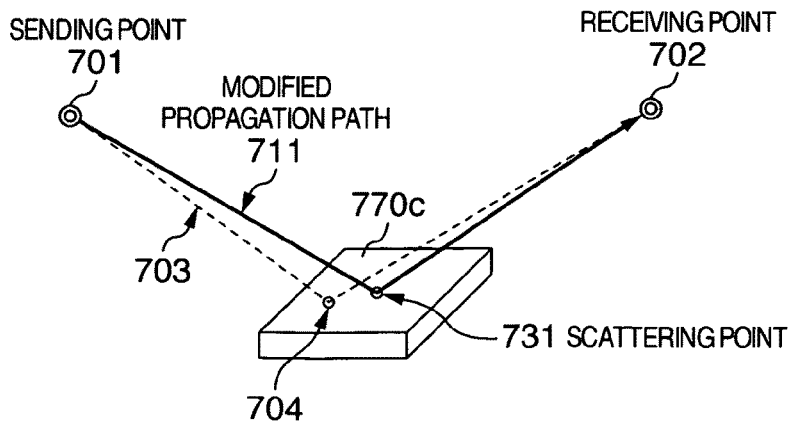
FIG. 7C illustrates a point type method for modifying a propagation path when a reflection has occurred.

First, a case in which the propagation path is reflected at and transmitted through a surface of a structural object contained in the shape indicated by the equivalent shape data 56a is described by referring to FIGS. 7A-7C. FIG. 7A shows a face type. Where a sending point 701 and a receiving point 702 are given, radio waves are reflected at a reflecting point 704 on a local structural object 770a. Its propagation path 703 is calculated. It is assumed that the sending point 701 and receiving point 702 are the position of a transmitting antenna and the position of a receiving antenna, respectively, or reflecting points on other local structural object. In the case of the face type of FIG. 7A, the propagation path 703 is used intact.

FIG. 7B shows an edge type. It is assumed that an edge 721 scattering radio waves exists on a local structural object 770b and that the edge 721 is specified by a coordinate point A (722) and a coordinate point B (723). That is, the edge 721 is represented by a line segment connecting two points. If the sending point 701 and the receiving point 702 are given, a scattering point 730 giving the shortest path in going from the sending point 701 to the receiving point 702 is determined on a point over the edge 721. The shortest path is used as a modified propagation path 710. The scattering point 730 is termed a scattering point.

FIG. 7C shows a point type. A point at which radio waves are scattered exists on a local structural object 770c. If a sending point 701 and a receiving point 702 are given, the propagation path becomes a modified propagation path 711. The point at which radio waves are scattered is known as a scattering point 731.

By what type is the propagation path modified is specified by a flag linked to the type. Plural propagation paths may be produced by using these types in combination or using plural ones of the same type.

<<Modification of Propagation Path in Case Where Fresnel Zone is Taken into Account>>

Figure 8:
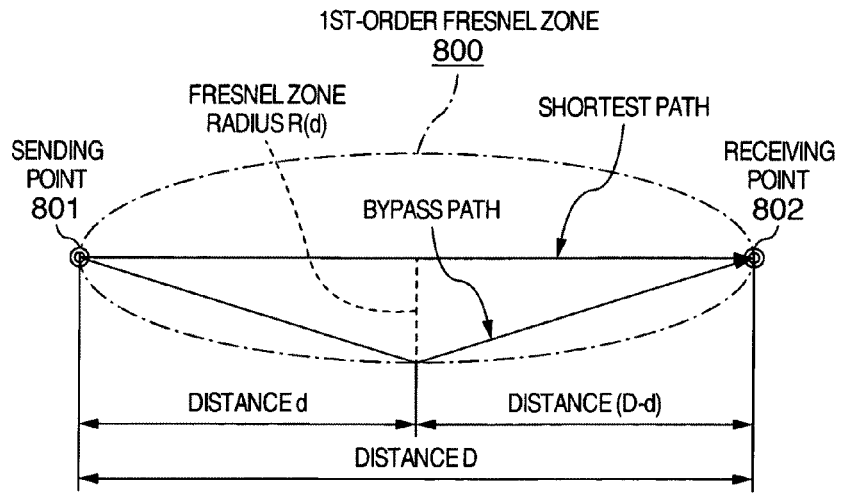
FIG. 8 is a diagram illustrating Fresnel zone characteristics.
Figure 9:
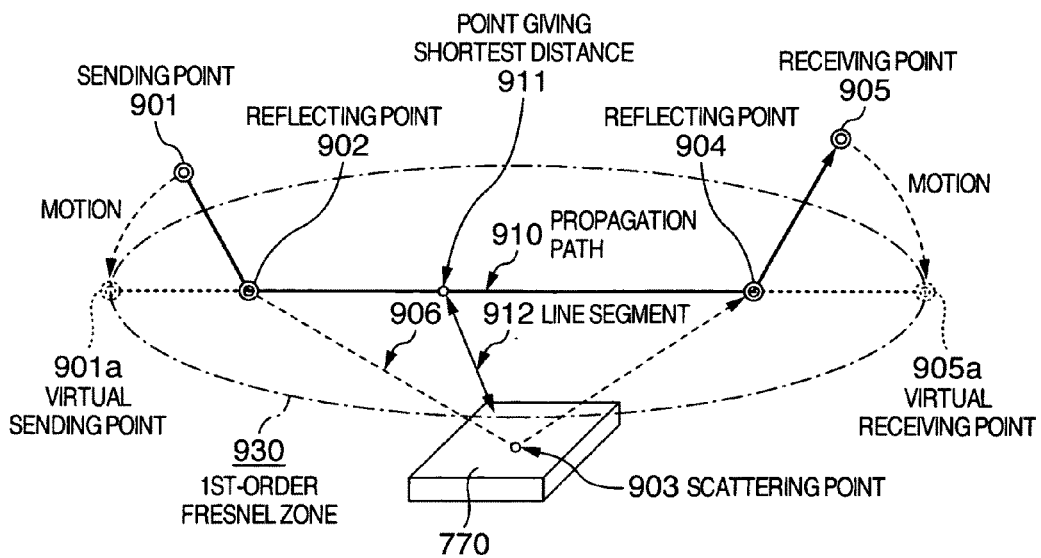
FIG. 9 represents a specific example of decision made as to whether or not any structural object is present in a region within a Fresnel zone radius.

A decision made as to whether a local structural object is contained in a region within a first-order Fresnel zone radius relative to the propagation path is next described by referring to FIGS. 8 and 9. FIG. 8 shows a first-order Fresnel zone 800, which is a spheroidal space including a trajectory of a path in which the path difference between a case where radio-wave energy arrives at a receiving point 802 from a sending point 801 in the shortest path and a case where the energy reaches it via a bypass path is equal to or less than a half of the wavelength λ of the radio waves. The Fresnel zone radius R (d) of the first-order Fresnel zone 800 is given by $$R(d) = \sqrt{\frac{\lambda d(D-d)}{D}} \quad (1)$$

where D is the distance between the sending point 801 and the receiving point 802, d is the distance from the sending point 801, and λ is the wavelength of radio waves.

The Fresnel zone radius Rn (d) of the nth order (second, third, or higher order) is given by $$Rn(d) = \sqrt{\frac{n\lambda d(D-d)}{D}} \quad (2)$$

If any object such as a structural object creating an obstruction does not exist in the first-order Fresnel zone 800, the received electric power can be calculated at an accuracy close to that given by the theory of radio wave propagation theory in free space. However, where a structural object which might be a raining area exists in the first-order Fresnel zone 800, the computational accuracy deteriorates. Accordingly, where a propagation path through which a ray passes is considered as the shortest path shown in FIG. 8, a decision is made as to whether there exists any structural object in a region within the Fresnel zone radius R (d) relative to the shortest path. If the decision is Yes such a structural object exists in the region within the Fresnel zone radius R(d)), then the path is determined as a candidate for a modified propagation path.

FIG. 9 shows one specific example of decision made as to whether there exists any structural object in the region within the Fresnel zone radius R (d). FIG. 9 shows a case in which reflecting points 902 and 904 exist in a propagation path 910 going from a sending point 901 to a receiving point 905. A propagation path 906 indicates a path from the reflecting point 902 to the reflecting point 904 via a scattering point 903. In this case, a sending point 901 and a receiving point 905 are moved to an extension of the line segment connecting the reflecting points 902 and 904 while maintaining constant the distance between the sending point 901 and the reflecting point 902 and the distance between the receiving point 904 and the receiving point 905. The resulting points are referred to as a virtual sending point 901a and a virtual receiving point 905a, respectively. A first-order Fresnel zone 930 relative to the virtual sending point 901a and virtual receiving point 905a is computed. Then, a line normal to the propagation path 910 is drawn to the local structural object 770. A point 911 giving the shortest distance from the propagation path 910 to the local structural object 770 is calculated. The line segment 912 between the point 911 giving the shortest distance and the structural object 770 is calculated. The length of the line segment 912 and the Fresnel zone radius are compared. If the length of the line segment 912 is smaller than the Fresnel zone radius, then the propagation path 910 is taken as a candidate for a modified propagation path.

Figure 10A:
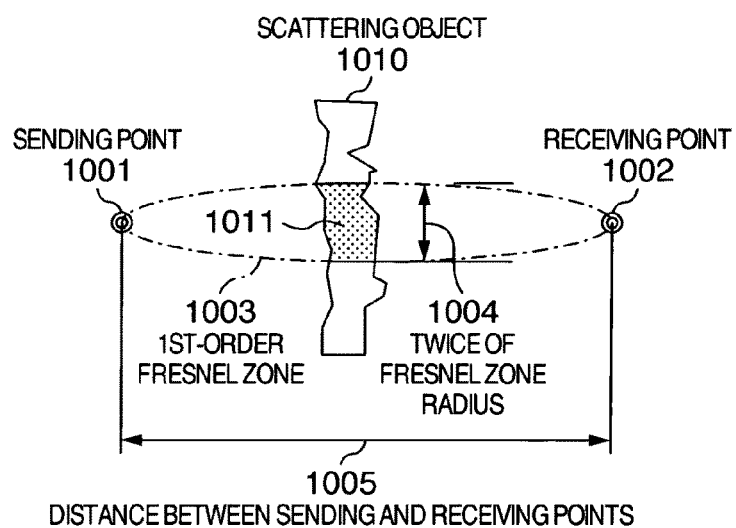
FIG. 10A is a diagram illustrating a method of calculating local scattering data in a case where the distance between a sending point and a receiving point is small.

FIG. 10A illustrates a concept of calculating local scattering data in cases where a scattering object 1010 exists in a first-order Fresnel zone 1003 relative to the distance 1005 between a sending point 1001 and a receiving point 1002. The scattering object 1010 may be a heavily raining area, as well as a structural object. The portion 1011 of the scattering object 1010 that is contained within the Fresnel zone 1003 is a range to be analyzed by the numerical analysis portion 22 (see FIG. 3) for Maxwell's equations. A length of the portion 1011 is as twice as the radius of Fresnel zone as indicated by the reference numeral 1004 of FIG. 10A.

Figure 10B:
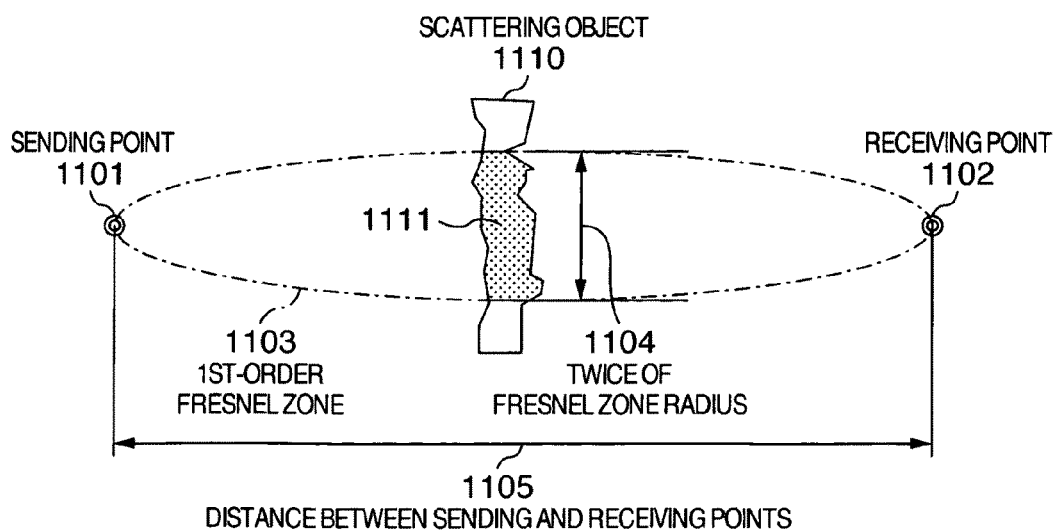
FIG. 10B is a diagram illustrating a method of calculating local scattering data in a case where the distance between a sending point and a receiving point is great.

FIG. 10B shows a case in which the distance 1105 between a sending point 1101 and a receiving point 1102 is greater than the distance 1005 between the sending and receiving points in FIG. 10A. In FIG. 10B, the first-order Fresnel zone 1103 is greater than the first-order Fresnel zone 1003 of FIG. 10A. The portion 1111 of the scattering object 1110 contained in the Fresnel zone 1103 is also greater and a length of the portion 1111 is as twice as the radius of Fresnel zone as indicated by the reference numeral 1104 of FIG. 10B. Thus, it can be seen that the numerical analysis portion 22 for Maxwell's equations needs to perform an analysis using the distance between a sending point and a receiving point as a variable.

Accordingly, as shown in FIG. 11, the incident angle 1201 of rays, the exit angle 1202 of rays, a set of values 1203 (i.e., the distance between a sending point and a receiving point, the coefficient of the vertically polarized wave component, and the coefficient of the horizontally polarized wave component), and another set of values 1204 (i.e., the distance between another sending point and another receiving point, the coefficient of the vertically polarized wave component, and the coefficient of the horizontally polarized wave component) are interrelated and stored as local scattering data 1100 in the storage portion 50. The coefficient of the vertically polarized wave component and the coefficient of the horizontally polarized wave component are the ratios of the strength of outgoing electric field to the strength of incident electric field.

<<Computational Flow of Optimization>>

Figure 12:
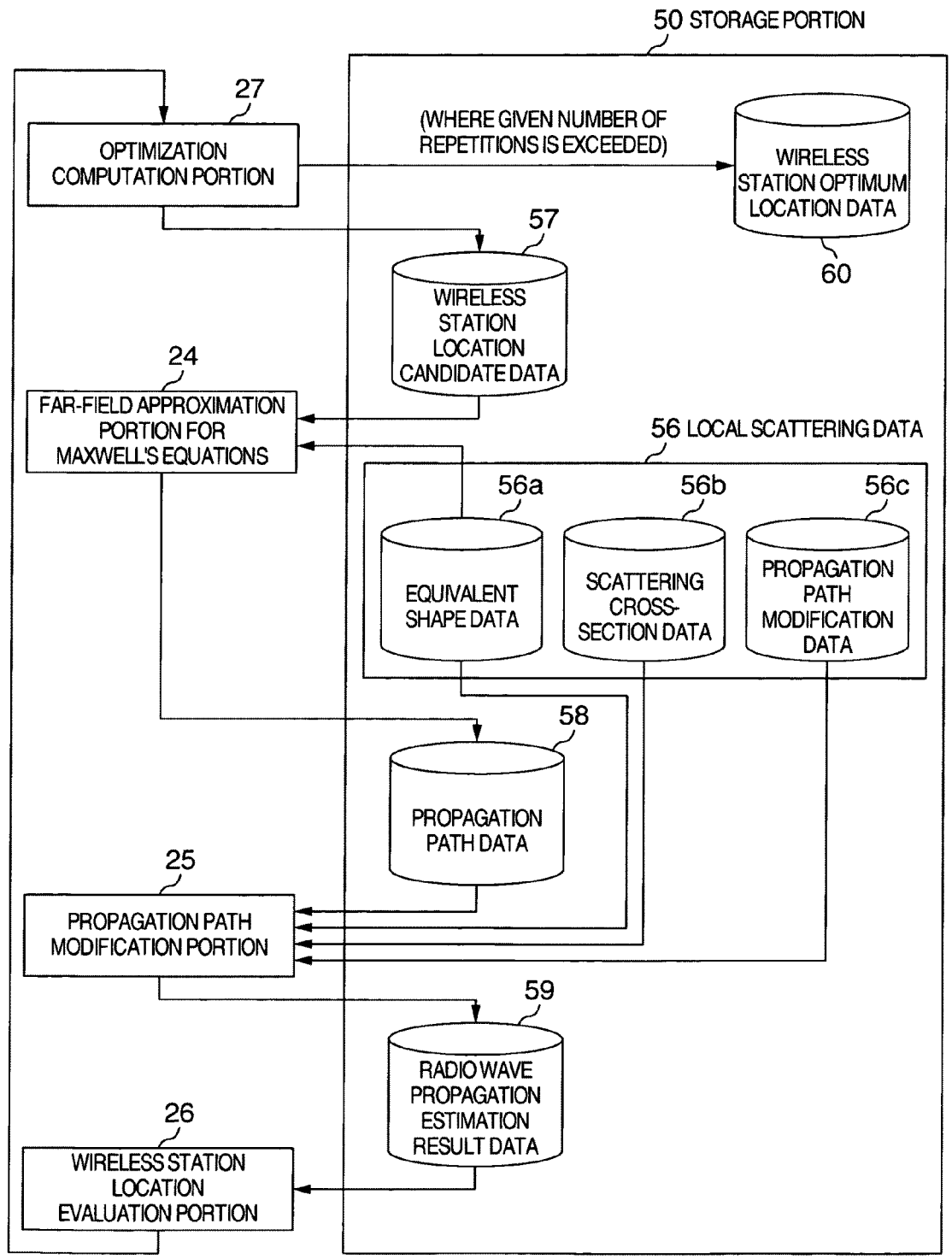
FIG. 12 is a block diagram of an apparatus for performing optimization computations according to one embodiment of the invention.

The computational flow of optimization illustrated in FIG. 12 is next described. First, the optimization computation portion 27 searches an area where wireless stations are arranged, using a parameter search technique. Examples of the parameter search technique include experimental design and genetic algorithm. The computation portion 27 creates wireless station location candidate data 57 indicating the locations of wireless stations, using a parameter search technique specified by a user. The wireless station location candidate data 57 includes the coordinates of the antennas of the wireless stations, their installation angles, the directional characteristics of the antennas, the gains of the antennas, transmission power, and cable loss. The computation portion 27 carries out step S101 shown in FIG. 1.

The far-field approximation portion 24 for Maxwell's equations analyzes the propagation paths of radio waves propagating between a sending station and a receiving station while treating the space of a relatively wide area by neglecting the near-field components of the Maxwell's equations. Ray tracing algorithms finding wide application as geometrical optics approximations of Maxwell's equations can be used in the far-field approximation portion 24 for Maxwell's equations. For example, a ray tracing algorithm described by J. W. McKown and R L. Hamilton, Jr., "Ray tracing as a design tool for radio networks", IEEE Network Magazine, Vol. 5, No. 6, pp. 27-30, November 1991, can be used. Ray tracing algorithms include ray-launching method and imaging method which are different in calculational method. Any of these methods can be applied to the present embodiment.

The far-field approximation portion 24 for Maxwell's equations receives the wireless station location candidate data 57 and the equivalent shape data 56a and analyzes the propagation of radio waves by making use of geometrical optics approximations. The approximation portion 24 creates data 58 about the propagation path between the transmitting antenna and the receiving antenna as a result of the analysis of the propagation of radio waves. The propagation path data 58 assumes the form of a line graph starting at the transmitting antenna (starting point) and ending with the receiving antenna (ending point). The points forming the line graph are reflecting point, transmission point, diffraction point, in addition to the starting and ending points. Once the propagation path data 58 is created, it is possible to calculate reflection coefficient, transmission coefficient, and diffraction coefficients, using attenuation of the electric field due to the length of the propagation path and material characteristics, the direction of polarization of electric field, incident angle of the radio waves, and radiation angle at each of the reflecting point, transmission point, and diffraction point. The far-field approximation portion 24 for Maxwell's equations carries out step S102 shown in FIG. 1.

The propagation path modification portion 25 extracts a propagation path passing through a first-order Fresnel zone containing a structural object (including a scattering object) indicated by the equivalent shape data 56a specified via the input portion 40 (see FIG. 2) from the propagation path data 58. Furthermore, the modification portion 25 adds scattering points to the extracted propagation path based on the propagation path modification data 56c corresponding to the specified equivalent shape data 56a and creates data about a modified propagation path going through the scattering points. Then, the modification portion 25 calculates the incident angle to each of the scattering points and the exit angle from each of the scattering points. The modification portion refers to the scattering cross-section data 56b, reads out complex scattering factors, and reflects them in the propagation path data 58. In this way, the propagation path modification portion 25 computes radio wave propagation estimation result data 59 by making amendments to the propagation path data 58. In particular, the modification portion 25 calculates propagation loss and propagation shift of the modified propagation path to create the radio wave propagation estimation result data 59. The modification portion 25 carries out steps S103 and S104 shown in FIG. 1.

The wireless station location evaluation-and-calculation portion 26 estimates or evaluates the states of communications at the locations of the wireless stations, using the radio wave propagation estimation result data 59. That is, the wireless station location evaluation-and-calculation portion 26 calculates the communication characteristics at a single link for each propagation path by taking account of the received power, delay profile, angle of arrival, and characteristics of the receiver circuit. Furthermore, the calculation portion 26 separately calculates the communication characteristics of propagation paths suffering from interference from other wireless stations and evaluates the degree of interference at the receiving station. The wireless station location evaluation-and-calculation portion 26 carries out step S105 shown in FIG. 1.

The processing of optimization computations is performed by the optimization computation portion 27 described previously. A parameter search technique is applied to the result of the evaluation made by the wireless station location evaluation-and-calculation portion 26 to create next wireless station location candidate data 57. Again, the created wireless station location candidate data 57 is computationally processed by the far-field approximation portion 24 for Maxwell's equations, the propagation path modification portion 25, and the wireless station location evaluation portion 26. In this way, during the processing of optimization computations, a repetitive arithmetic operation is performed. If the specified number of repetitions is exceeded, the optimization computation portion 27 outputs wireless station optimum location data 60. The optimization computation portion 27 carries out steps S106 and S107 shown in FIG. 1.

In this way, the local scattering data 56 is previously calculated for each of various incident angles. Consequently, if a geometrical optics computation requiring only a small amount of computational resources is used in the radio wave propagation analysis included in the optimization computation using the repetitive arithmetic operation shown in FIG. 12, the propagation path can be modified accurately and easily. Therefore, it is possible to search for optimum locations of wireless stations, based on the analysis results of the radio wave propagation of high estimation accuracy <<Example of Incident Angle Setting Screen>>

FIG. 13 shows an incident angle setting screen 1301 for setting or editing incident angles via the division-and-conversion portion 21 (see FIG. 3). The vertical axis of the setting screen 1301 indicates an angle θ (see FIG. 5) relative to the Z-axis. The horizontal axis indicates an angle φ (see FIG. 5) relative to the X-axis. FIG. 13 shows one example in which the range of angles θ, from 0 degree to 180 degrees, is divided into 100. The range of angles φ, from 0 degree to 360 degrees, is divided into 10. Note that the number of divisions is not limited to 10.

Each small circle (○) within the incident angle setting screen 1301 indicates an incident angle at one combination of angles θ and φ. Where setting information is set or edited in response to the incident angle, if the user aligns the mouse pointer (mouse cursor) to any one of the small circles (○), the setting information can be set or edited in response to the incident angle. The setting information includes information indicating whether or not it is necessary to perform an analysis at the incident angle by the numerical analysis portion 22 for Maxwell's equations. Where the setting information is set in such a way that it is necessary to perform an analysis, the division-and-conversion portion 21 creates the local structure data 53 (see FIG. 3). Where the setting information at some incident angle is not so set that implementation of an analysis is needed, the division-and-conversion portion 21 does not create the local structure data 53 at that incident angle.

The incident angle setting screen 1301 is equipped with a function of making a setting to cause the setting information set at some incident angle to refer to the setting information at another incident angle. For example, the arrow of reference information 1331 indicates a setting for causing setting information A (1321) at incident angles $\theta=66.4$ and $\phi=36.0$ to refer to setting information B (1322) at incident angles $\theta=66.4$ and $\phi=108.0$. That is, if a structural object to be analyzed shows an equivalent shape in response to the incident angles, the processing of the analysis can be omitted by setting the reference information 1331.

The reference information creation button 1311 is used to create reference information collectively at a time. For example, the reference information can be set at the incident angle of a rotational direction by specifying any one of the X-, and Z-axes and taking the specified axis as the axis of rotation. Furthermore, pieces of setting information can be set at symmetric positions with respect to a plane specified from XY plane, YZ plane, and ZX plane. Furthermore, for each of incident angles at symmetric positions, reference information can be set at the incident angle.

The local structure data 53 at an arbitrary incident angle other than the incident angles at which an analysis was performed is found by interpolation. Where it is previously known that there are large variation rates of scattering at arbitrary incident angles other than the incident angles at which an analysis was performed, the number of divisions of incident angles is increased only in the range of incident angles where the variation rates of scattering are large to cope with the problem.

The division-and-conversion portion 21 can efficiently reduce the computational resources by creating the setting information set at each incident angle in this way.

As described so far, the wireless station location searching apparatus 10 of the present embodiment previously performs a near-field approximation computation that needs a large amount of computation and calculates the local scattering data 56 at various incident angles. In the radio wave propagation analysis during an optimization computation using the repetitive calculation illustrated in FIG. 12, even if a geometrical optics computation consuming only a small amount of computational resources is used, the propagation path can be modified accurately and easily. Therefore, based on the results of radio wave propagation analysis of high estimation accuracy, it is possible to search for optimum locations of wireless stations. In addition, computation of near-field approximation requiring a large amount of computation is not included in the flow subroutine of the optimization computation. In consequence, the optimization computation can be performed at high speed.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A wireless station location searching apparatus for performing calculations for searching a given communication area for locations of a plurality of wireless stations arranged in the communication area, said wireless station location searching apparatus comprising:
an analysis portion calculating scattering information for each local structural segment based on an analysis performed taking account of near-field components of Maxwell's equations, the scattering information associated with a state of outgoing scattering in response to incidence of radio waves for said each local structural segment of an object constituting a local structure and disturbing propagation of radio waves within the communication area;
a storage portion to store the scattering information; and
a processing portion repeatedly for carrying out a repetitive arithmetic operation for optimizing the locations of the wireless stations, setting radio wave sending points and radio wave receiving points corresponding to the locations of the wireless stations during the repetitive arithmetic operation, calculating propagation paths between the sending points and the receiving points using a far-field approximation method for Maxwell's equations, extracting a propagation path in which propagation of radio waves is disturbed by the local structure from the calculated propagation paths, modifying the extracted propagation path using the scattering information stored in the storage portion, evaluating communication characteristics based on the modified propagation path, and
wherein said processing portion carries out said repetitive arithmetic operation repeatedly a given number of times and outputs the locations of the wireless stations that give appropriate communication characteristics.

2. The wireless station location searching apparatus according to claim 1, wherein said scattering information includes scattering factors of output angles respectively corresponding to incident angles of radio waves and a local model expressed with omission of its fine structures that can be neglected compared with wavelengths of the radio waves.

3. The wireless station location searching apparatus according to claim 2, wherein said scattering information includes propagation path modification information associated with propagation loss and phase shift in said propagation path.

4. The wireless station location searching apparatus according to claim 3, wherein said propagation path modification information is selected from any one of: a case where said propagation path is not modified; a case where a via point in the propagation path is modified to lie on a line segment between two points specified by a user; and a case where the via point in the propagation path is modified to lie on a single point specified by the user.

5. The wireless station location searching apparatus according to claim 1, wherein when the propagation path in which propagation of radio waves is disturbed by the local structure is extracted, said processing portion sets a distance between the propagation path and the local structure as a length of a line segment made when a line normal to the propagation path reaches the local structure and determines that the propagation path is disturbed by the local structure if the length of the line segment is equal to or less than a given length.

6. The wireless station location searching apparatus according to claim 5, wherein said given length is a first-order Fresnel zone radius relative to a total distance of the propagation path from the sending point to the receiving point.

7. The wireless station location searching apparatus according to claim 3, wherein a total distance of the propagation path from the sending point to the receiving point, the scattering factors, the local model, and the propagation path modification information are interrelated and stored in said storage portion regarding said scattering information, and wherein said processing portion carries out said repetitive arithmetic operation on the local model contained in the first-order Fresnel zone relative to the total distance of the propagation path from the sending point to the receiving point while referring to the scattering information.

8. The wireless station location searching apparatus according to claim 2, wherein said processing portion causes the angle of incidence included in said scattering information to be set discretely for each solid angle subtending each single point on said local model.

9. The wireless station location searching apparatus according to claim 8, wherein said processing portion calculates scattering information at an arbitrary incident angle by performing an interpolation using the incident angles set discretely.

10. The wireless station location searching apparatus according to claim 9, wherein said solid angle is set to a smaller value in a range where said scattering varies greatly.

11. The wireless station location searching apparatus according to claim 8, wherein said processing portion creates scattering information relative to each of the discretely set incident angles for each of the incident angles based on a flag indicating whether or not said scattering information is calculated using an analysis performed taking account of near-field components of said Maxwell's equations and on reference information indicating that scattering information set at another incident angle is referenced to.

12. A method of searching for wireless station locations, comprising:
   finding an object that will disturb propagation of radio waves within a communication area;
   dividing the object into local structures;
   calculating scattering information for each local structural segment based on an analysis performed taking account of near-field components of Maxwell's equations, the scattering information associated with a state of outgoing scattering in response to incidence of radio waves for said each local structural segment of an object constituting a local structure and disturbing propagation of radio waves within the communication area;
   storing the scattering information about each of the local structures into memory;
   carrying out a repetitive arithmetic operation in which locations of a plurality of wireless stations are optimized repeatedly a given number of times; the repetitive arithmetic operation comprising:
   setting sending points and receiving points of the radio waves corresponding to respective ones of the locations of the wireless stations during the repetitive arithmetic operation;
   calculating propagation paths between the sending points and the receiving points using a far-field approximation technique for Maxwell's equations;
   extracting a propagation path in which propagation of radio waves is disturbed by the local structures from the calculated propagation paths;
   modifying the extracted propagation path using the scattering information stored in the storage portion; and
   evaluating communication characteristics based on the modified propagation path; and
   outputting the locations of the wireless stations giving appropriate communication characteristics.

\* \* \* \* \*